United States Patent [19]
Miyamoto et al.

[11] Patent Number: 5,520,001
[45] Date of Patent: May 28, 1996

[54] VAPOR CONTROLLER

[75] Inventors: Hideaki Miyamoto; Kohichi Ishikawa; Takeshi Kawano, all of Miyanohigashi-machi, Japan

[73] Assignee: Stec, Inc., Kyoto, Japan

[21] Appl. No.: 387,098

[22] Filed: Feb. 13, 1995

[30] Foreign Application Priority Data

Feb. 20, 1994 [JP] Japan .................................. 6-044992
Mar. 2, 1994 [JP] Japan .................................. 6-058198

[51] Int. Cl.⁶ .................................................. F17C 9/02
[52] U.S. Cl. .................................. 62/50.2; 62/50.7
[58] Field of Search ............................ 62/50.2, 50.7

[56] References Cited

U.S. PATENT DOCUMENTS

| | | | |
|---|---|---|---|
| 3,950,959 | 4/1976 | Coureau | 62/50.7 |
| 4,220,312 | 9/1980 | Pauliukonis | 62/50.2 |
| 5,031,408 | 7/1991 | Horne et al. | 62/50.2 |
| 5,272,880 | 12/1993 | Nishizato et al. | 62/50.2 |

*Primary Examiner*—Ronald C. Capossela
*Attorney, Agent, or Firm*—Price, Gess & Ubell

[57] ABSTRACT

A vapor controller capable of reducing a thermal influence upon a liquid material to be vaporized as far as possible and always stably controlling a vaporized gas in flow rate in high-speed response and a vapor controller having a vaporizer capable of improving a purge efficiency are provided. A vapor controller in which a vaporizer covered with a diaphragm is formed in a body block including a heater and a temperature sensor while a liquid material inlet passage and a gas outlet passage is formed within said body block so as to be opened on an end face of the body block at one end thereof, respectively, and communicated with said vaporizing chamber at the other end thereof, respectively, said diaphragm being driven by a pressedly driving portion provided in the body block to adjust an openness of an opening facing to the vaporizing chamber of said liquid material inlet passage, said liquid material introduced into the vaporizing chamber through the liquid material inlet passage being vaporized within the vaporizing chamber, and a gas generated by a vaporization being discharged through said gas outlet passage.

19 Claims, 6 Drawing Sheets

VAPOR CONTROLLER

BACKGROUND OF THE INVENTION

1. Field of the Invention

The present invention relates to a vapor controller capable of quantitatively vaporizing liquid materials, such as silicon tetrachloride ($SiCl_4$), used in for example an apparatus for producing semiconductors.

2. Description of the Prior Art

In one of the conventional vapor controllers, as shown in FIG. 12, a liquid material tank 82 housing a liquid material LM therein is provided within a thermostatic oven 81 suitably set in temperature, said liquid material tank 82 being suitably heated by means of a plate heater 83 to rise a temperature within the liquid material tank 82, whereby increasing a vapor pressure of said liquid material LM to vaporize the liquid material LM, and a vaporized gas G being directly controlled in flow rate by means of a gas mass flow controller (hereinafter referred to as GMFC) by obtaining a differential pressure relative to an outlet side.

In addition, in another example of the conventional vapor controllers, as shown in FIG. 13, a vaporizing chamber 93 filled with powdery substances 93 superior in thermal conductivity and corrosion resistance is formed within a metallic block 91 including a heater (not shown) therein, said vaporizing chamber 93 being provided with a liquid material supply line 94 for introducing the liquid material LM thereinto and a carrier gas supply line 95 for introducing a carrier gas CG thereinto connected with one end side thereof, the upstream side of said liquid material supply line 94 being connected with a liquid material tank 98 through a liquid material mass flow controller (hereinafter referred to as LMFC) 96 and a stop valve 97, and said liquid material LM, which has been controlled in flow rate by means of said LMFC 96 under the condition of liquid material, being introduced into the vaporizing chamber 93 to vaporize the total quantity of the liquid material LM. In addition, reference numeral 99 designates a thermostatic oven and reference numeral 100 designates an inert gas-introducing pipe.

However, in said vapor controller shown in FIG. 12, a disadvantage has occurred in that it is necessary to heat the whole liquid material tank 82 and the liquid material LM is always influenced by heat, so that not only a thermal decomposition and a change in composition are brought about but also impurities are dissolved out of the liquid material tank 82 to mix in the liquid material LM. In addition, in the vapor controller shown in FIG. 12, a disadvantage has occurred in that a gas flow rate is directly controlled, so that a time from a start of generation of gas to a stabilization of flow rate is greatly dependent upon a performance of said GMFC 84 and thus the GMFC 84 of high performance characteristics so much as that must be used and consequently cost is increased. In addition, a vapor pressure at an appointed heating temperature is low in dependence upon different kinds of liquid material LM according to circumstances, so that it has been necessary to reduce a pressure-drop of the GMFC 84 as far as possible.

Furthermore, in said vapor controller shown in FIG. 13, inert gases, such as nitrogen and helium, are supplied in said liquid material tank 98 to increase a pressure within the liquid material tank 98, whereby sending the liquid material LM to the side of the vapor controller under pressure by a supply pressure, so that said inert gases used for pressurizing the liquid material LM within the liquid material tank 98 is dissolved in the liquid material LM according to circumstances and consequently the liquid material LM is supplied to the vapor controller under the condition that dissolved gases are included.

And, when a local pressure-drop is produced in the LMFC 96 provided in the liquid material supply line 94, said dissolved gases in the liquid material LM are released into the liquid material supply line 94 (this is called a cavitation). In such the manner, the gases released into the liquid material supply line 94 are turned into very small bubbles but there is the possibility that these bubbles are collected in a stand of the supply line and the like to intermittently and periodically introduce larger bubbles into the vaporizing chamber 93. Consequently, vapors led out of the vapor controller comes into question according to circumstances in respect of stability of flow rate. In the case where the secondary side (downstream side) of the vaporizing chamber 93 is vacuous, this phenomenon becomes more notable. That is to say, because not only the dissolved gases but also the liquid material LM are vaporized in the liquid material supply line 94.

Moreover, in the vapor controller shown in FIG. 13, a disadvantage has occurred in that the vaporizing chamber 93 is filled with said powdery substances 92, so that a pressure-loss is produced within the vaporizing chamber 93 to take a time until a pressure rising during a time when the liquid material LM controlled by means of the LMFC 96 is introduced into the vaporizing chamber 93 to be vaporized is brought into an equilibrium condition within the vaporizing chamber 93 and thus a response as the gas flow rate becomes deteriorated.

Besides, in the case where the liquid material LM has a high reactivity, for example the liquid material LM acts upon water in air to produce reaction products, it has been necessary when parts of the vapor controller in trouble are exchanged that the liquid material is sufficiently removed from an inside of a pipe of a liquid material-introducing passage formed within the vapor controller to avoid a formation of reaction products as far as possible. In order to remove the liquid material remaining in said pipe, methods, such as gas purge, liquid purge or vacuum exhaust, have been used but it has been necessary that a purge gas is sent into the vapor controller from the upstream side of the vapor controller by means of a pump provided on the downstream side of the vapor controller for exhausting from a chamber of the apparatus for producing semiconductors to conduct said gas purge and said vacuum exhaust and the purges are conducted through the vapor controller, so that a pressure-loss is increased and thus it has been difficult to obtain a sufficient purge efficiency. The similar matters hold good in case of said liquid purge.

SUMMARY OF THE INVENTION

The present invention has been achieved paying attention to the above described matters and it is an object of the present invention to provide a vapor controller capable of reducing a thermal influence upon a liquid material to be vaporized as far as possible and always stably controlling a vaporized gas in flow rate in high-speed response and a vapor controller having a vaporizer capable of improving a purge efficiency.

In order to achieve the above described object, said vapor controller according to the present invention is characterized in that said vaporizer covered with a diaphragm is formed in a body block including a heater and a temperature sensor while a liquid material inlet passage and a gas outlet passage is formed within said body block so as to be opened on an end face of the body block at one end thereof, respectively, and communicated with said vaporizing chamber at the other end thereof, respectively, said diaphragm being driven by a pressedly driving portion provided in the body block to adjust an openness of an opening facing to the vaporizing chamber of said liquid material inlet passage, said liquid material introduced into the vaporizing chamber through the liquid material inlet passage being vaporized within the vaporizing chamber, and a gas generated by a vaporization being discharged through said gas outlet passage.

In this case, in place of including said heater and said temperature sensor in the body block, the body block may be housed in a thermostatic oven or heated by an infrared lamp, that is the body block may be constructed so as to be heated from an outside.

In addition, the liquid material inlet passage, the gas outlet passage, a first line branched from the liquid material inlet passage for communicating with an outside of the body block and a second line communicated with said outside of the body block at both end portions thereof for purging the liquid material inlet passage may be formed in the body block of the vapor controller having a vaporizing function and a flow rate-adjusting function and vaporizing and controlling the liquid material supplied from a liquid material tank and an on-off valve making a communication of said first line with said second line possible by opening and closing a seat portion may be provided.

Furthermore, in view of another point, a liquid material vapor controller, characterized in that a liquid material inlet passage communicating with a vaporizing chamber, a plurality of liquid material supply lines branched from said liquid material inlet passage and communication lines of a number corresponding to said liquid material supply lines communicated with an outside of a body block at both end portions thereof are formed in the body block of said vapor controller having a vaporizing function and a flow rate-adjusting function and vaporizing and controlling a liquid material supplied from a liquid material tank, a plurality of on-off valves making a communication of said respective communication lines with the respective liquid material supply lines corresponding to the respective communication lines possible by opening and closing respective seat portions being provided, and one on-off valve selected from said plurality of on-off valves being used for purging the liquid material supply lines, is provided.

And, in either case above described, the body block is preferably made of metals, ceramics or heat-resisting resins such as fluororesins.

In the vapor controller having the above described constructions, not only said vaporizing chamber has said vaporizing function and said flow rate-adjusting function but also a dead volume of the vaporizing chamber is remarkably small. Consequently, a vaporized gas generated in the vaporizing chamber is speedily led out of the vaporizing chamber and thus a high-speed response becomes possible. And, repeated generations of said vaporized gas for a short time become possible by a possibility of said high-speed response and a pressure-change can be eliminated in a short time even though it is produced on the downstream side. In addition, as above described, the vaporizing chamber has the vaporizing function and the flow rate-adjusting function, so that an apparatus can be small-sized and reduced in cost.

Furthermore, the liquid material inlet passage communicated with the vaporizing chamber, a plurality of liquid material supply lines branched from the liquid material inlet passage and the communication lines of said number corresponding to the liquid material supply lines communicated with said outside of the body block at both end portions thereof are formed in the body block of the vapor controller having the vaporizing function and the flow rate-adjusting function and vaporizing and controlling the liquid material supplied from the liquid material tank and a plurality of on-off valves making the communication of the respective communication lines with the respective liquid material supply lines corresponding to the respective communication lines possible by opening and closing the respective seat portions are provided, so that a purge efficiency can be improved as compared with the conventional apparatus in which a purge has been conducted through the vapor controller. Moreover, the liquid material supply line can be purged without sending the liquid material in an exhaust pump of the apparatus for producing semiconductors provided on the secondary side (downstream side) of the vapor controller. Besides, the vapor controller can be always operated by merely leaving the seat portions of the on-off valves under the closed condition where the first line cannot be communicated with the second line, it becoming unnecessary that the exhausting pump is expressedly used to conduct the purge differently from the conventional vapor controllers, parts used for the purge being able to be kept at a minimum, and the maintenance being able to be easily conducted.

In addition, with the above described construction, the respective communication lines communicated with the outside of the body block at both end portions thereof can be connected with the liquid material supply lines corresponding thereto through the respective on-off valves and the communication line can be communicated with the liquid material supply line corresponding thereto by means of the seat portion provided in one on-off valve selected from the on-off valves to purge the liquid material supply line. That is to say, one of the characteristics of the present invention consists in that the liquid material supply line can be purged by merely using the communication line and the liquid material supply line corresponding to the communication line preliminarily formed in the body block, so that a purging course of the liquid material supply lines can be optionally selected. The selection of purge has, so to speak, a degree of freedom.

DETAILED DESCRIPTION OF THE PREFERRED EMBODIMENTS

Figure 1:
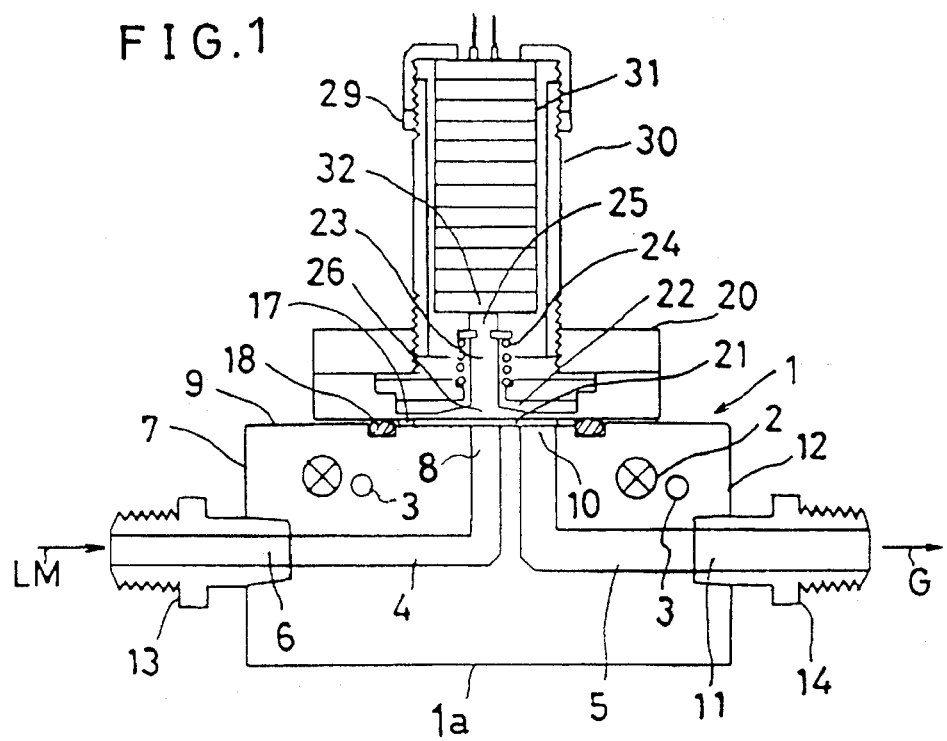
FIG. 1 is a longitudinal sectional view showing a first preferred embodiment of a vapor controller according to the present invention.
Figure 2:
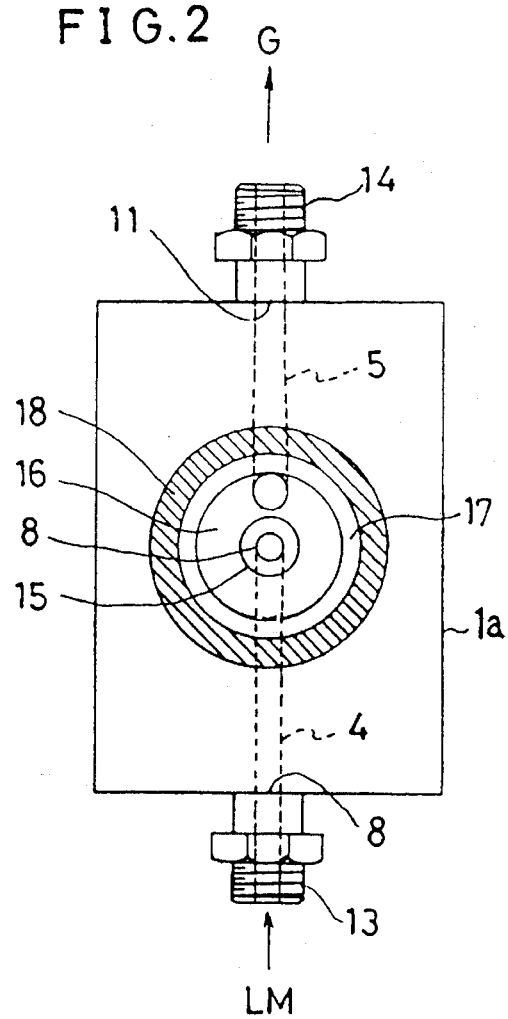
FIG. 2 is a drawing showing a plane construction of a body block of said vapor controller.
Figure 3:
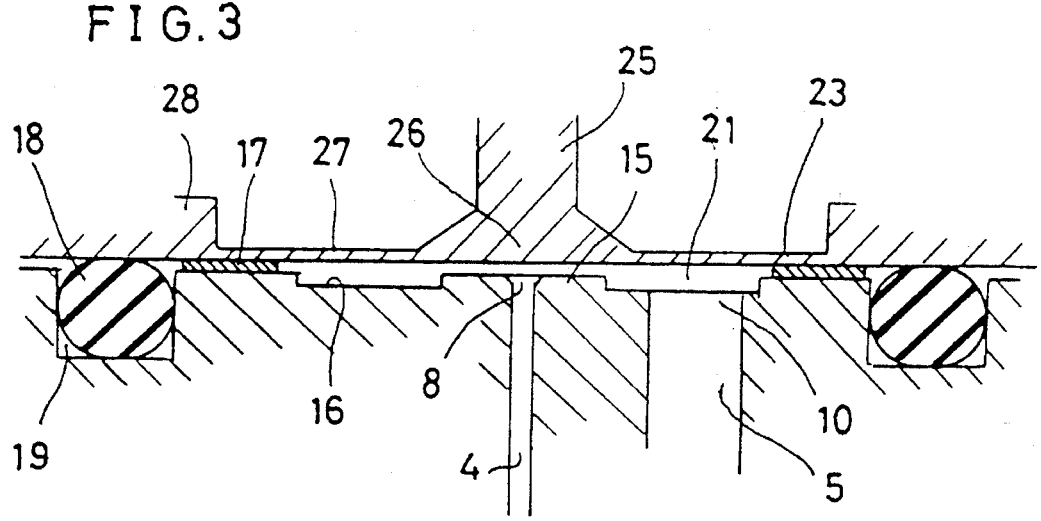
FIG. 3 is an expanded longitudinal sectional view showing an upper construction of said body block.

FIGS. 1 to 3 show one example of a vapor controller 1 according to the present invention. Referring to FIGS. 1, 2, reference numeral 1a designates a rectangular parallelepiped-shaped body block made of metallic materials, such as stainless steels, superior in thermal conductivity and corrosion resistance. Said body block 1a is provided with a temperature sensor 3, such as cartridge heater 2 and thermocouple, heating the whole body block 1a included therein although not in detail shown.

Reference numerals 4, 5 designate a liquid material inlet passage and a gas outlet passage formed within the body block 1a in a hook-like shape not so as to cross with each other. That is to say, one opening of said liquid one opening (liquid material inlet port) 6 of said liquid material inlet passage 4 is formed on one side surface 7 of the body block 1a and the other opening 8 of the liquid material inlet passage 4 is formed on an upper surface 9 meeting at right angles with said side surface 7 so as to introduce a liquid material LM into a vaporizing chamber 21 which will be mentioned later. In addition, one opening 10 of said gas outlet passage 5 is formed on said upper surface 9 and the other opening (gas outlet port) 11 of the gas outlet passage 5 is formed on a side surface 12 opposite to the side surface 7 so as to lead a gas G generated in said vaporizing chamber 21 out of the body block 1a. Reference numerals 13, 14 designates a joint connected with said liquid material inlet port 6 and said gas outlet port 11, respectively.

A construction on the upper surface 9 of the body block 1a will be below in detail described with reference to also FIG. 2 showing a plane construction of the body block 1a and FIG. B showing an upper construction of the body block 1a. Said opening 8 on the upper surface 9 of the liquid material inlet port 4 is opened in for example a central portion 15 of the upper surface 9. A groove 16 concentric with the opening 8 is formed around this central portion 15 and said opening 10 of the gas outlet passage 5 is opened so as to face to said groove 16. And, an inside diameter of the opening 8 is for example about 0.5 to 5 mm, an inside diameter of the opening 10 being for example about 2 to 4 mm, and a distance from the opening 8 to the groove 16 formed concentrically with the opening 8 being about 3 to 6 mm. It goes without saying that these dimensions are suitably determined in dependence upon a quantity of said liquid material LM introduced through the liquid material inlet port 6.

And, a ring spacer 17 made of stainless steels having a thickness of for example about 20 to 80 μm is provided out of the groove 16 so as to surround the groove 16, as shown in FIG. 3. This spacer 17 engagedly holds a lower periphery of a diaphragm 23 which will be mentioned later. Reference numeral 18 designates a sealing member provided so as to be engaged with a groove 19 provided out of the spacer 17 so as to surround the spacer 17 and a lower surface of a valve block 20, which will be in detail mentioned later, is engaged with this sealing member 18.

Referring to FIG. 1 again, reference numeral 20 designates a valve block placed on the upper surface 9 of the body block 1a and made of materials superior in thermal conductivity and corrosion resistance such as stainless steels. The vaporizing chamber 21 is formed between this valve block 20 and the upper surface 9. That is to say, a lower periphery of a diaphragm 23 is engaged with the spacer 17 within an internal space 22 of the valve block 20 so as to be always energized upward by means of a spring 24, whereby forming the vaporizing chamber 21 by this diaphragm 23 and the spacer 17.

The diaphragm 23 is made of materials superior in heat resistance and corrosion resistance and provided with a valve portion 26 engaged with or separated from the central portion 15 of the upper surface 9 to open and close the opening 8 of the liquid material inlet passage 4 formed below a shaft portion 25 thereof, a thin-walled portion 27 formed on a circumference of said valve portion 26 and a thick-walled portion 28 formed on a circumference of said thin-walled portion 27 as shown in FIG. 3. In usual, the valve portion 26 is separated from the central portion 15 by being energized upward by means of said spring 24, but, when said shaft portion 25 is subjected to a downward pressing force, the valve portion 26 is closely engaged with the central portion 15 to close the opening 8.

In this preferred embodiment, the diaphragm 23 is used as a member forming a valve for adjusting a flow rate of the liquid material LM and shutting off the liquid material LM as well as the vaporizing chamber 21 of the liquid material LM supplied to an inside of the body block 1a through the liquid material inlet port 6. Consequently, in order to more surely conduct the above described shutoff, a flat lower surface of the diaphragm 23 is coated or lined with fluororesins. In addition, in place of this coating and the like, the diaphragm 23 itself may be made of fluororesins.

And, the lower peripheral portion of diaphragm 2B is engaged with the spacer 17 so that the shaft portion 25 of the diaphragm 23 may be positioned in the upper part and all of the openings 8, 10 and the groove 16 formed on the upper surface 2b of the body block 1a may be included within the vaporizing chamber 21 formed on the lower surface side of the diaphragm 23. In short, the opening 8 of the liquid material inlet passage 4 is communicated with the opening 10 of the gas outlet passage 5 within the vaporizing chamber 21. And, this diaphragm 23 is pressed by an actuator 29, which will be mentioned later, to adjust an openness of the opening 8 for introducing the liquid material LM into the vaporizing chamber 21 or closing the opening 8, whereby controlling a quantity of liquid material LM introduced into the vaporizing chamber 21.

Reference numeral 29 designates an actuator pressing the diaphragm 23 downward to give a distortion to it. In this preferred embodiment, a piezostack 31 with a plurality of piezoelements piled is provided within a housing 30 standing on the valve block 20 to engage a pressing portion 32 of said piezostack 31 with the shaft portion 25 of the diaphragm 23, whereby forming a piezoactuator.

An operation of the vapor controller 1 having the above described construction will be below described with reference to also FIG. 4. As above described, the diaphragm 23 is always energized upward by an energizing force of the spring 24 and the valve portion 26 is separated from the upper surface 9 of the body block 1a with a slight gap, as shown in FIG. 3. Consequently, the openings 8, 9 on the upper sides of the liquid material inlet passage 4 and the gas outlet passage 5 are opened.

Figure 4:
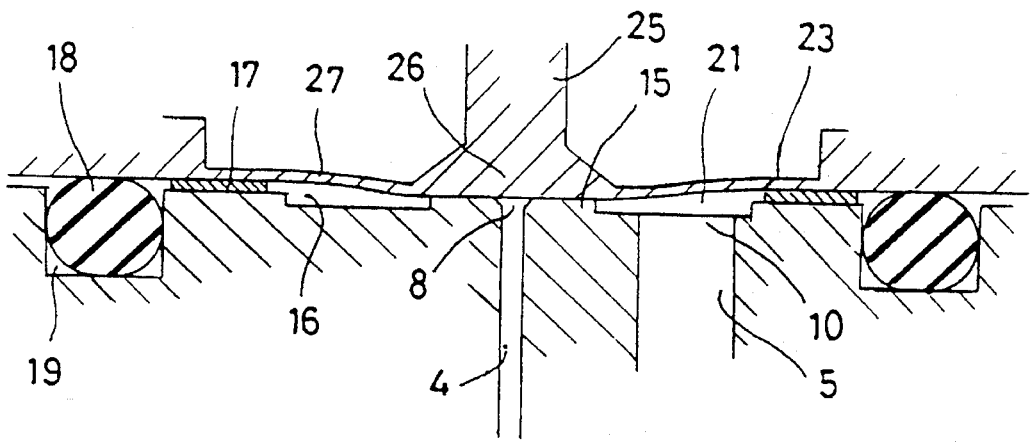
FIG. 4 is an operation diagram of the vapor controller.

And, upon electrifying the heater 2 and applying an appointed DC voltage to the piezostack 31 under the condition that body block 1a is being heated, the diaphragm 23 is pressed downward and a distortion is given to the valve portion 26 so that the valve portion 26 may be engaged with the central portion 15 on the upper surface 9 of the body block 1a, as shown in FIG. 4, to close the opening 8 of the liquid material inlet passage 4, whereby bringing about a liquid-shutting off condition. Consequently, even though the liquid material LM is supplied to the vapor controller 1 at a pressure of for example about 3 kg/cm$^2$, the liquid material LM does not flow into the vaporizing chamber 21.

Then, upon slightly reducing said voltage applied to the piezostack 31 than the above described applied voltage to reduce the pressing force applied to the diaphragm 23, the closure of the opening 8 by the diaphragm 23 is released to form a slight gap between the valve portion 26 and the central portion 15, whereby introducing the liquid material LM into the vaporizing chamber 21 through said gap. And, the liquid material LM is speedily vaporized by a pressure-drop accompanied by the flow thereof into the vaporizing chamber 21 and a heating (to for example about 100° C.) thereof by means of the heater 2 to flow the vaporized gas G toward the side of the gas outlet port 11 through the gas outlet passage 5.

As understood from the above description, in the vapor controller 1, not only the liquid material LM is speedily vaporized by said pressure-drop thereof accompanied by the flow thereof into the vaporizing chamber 21 and said heating thereof by means of the heater 2 but also the vaporized gas G can be speedily and efficiently discharged due to a remarkably small volume of the vaporizing chamber 21. And, the diaphragm 23 serves also as a valve for adjusting the flow rate of the liquid material LM and a constituent member of the vaporizing chamber 21 vaporizing the liquid material LM, so that a dead volume is not formed between the flow rate-adjusting valve and the vaporizing chamber differently from in the conventional vapor controller and thus bubbles are not accumulated and grown and a cavitation phenomenon, which has come into question in the conventional vapor controller, is not brought about. As a result, the desired flow rate of gas G can be stably supplied.

As above described, the vaporizing chamber 21 has the vaporizing function and the flow rate-adjusting function, so that the high-speed response becomes possible and the repeated short-time generation of the vaporized gas becomes possible. In addition, the vapor controller 1 can be compactized and reduced in cost. Furthermore, it goes without saying that the condition for most stably obtaining the vaporized gas G is to control the liquid material LM, whereby controlling the quantity of liquid material LM introduced into the vaporizing chamber 21.

Figure 5:
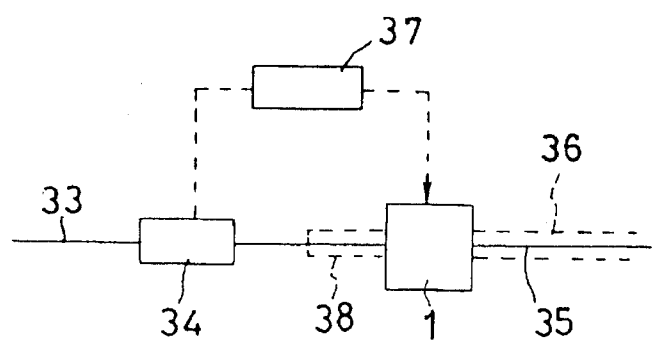
FIG. 5 is a block diagram showing a liquid material supply line with the vapor controller incorporated therein.

FIG. 5 shows an example in which the vapor controller 1 having the above described construction is incorporated in for example a material supply line of the apparatus for producing semiconductors. Referring to FIG. 5, reference numeral 33 designates a liquid material supply line on the upstream side of the vapor controller 1, reference numeral 34 designating a liquid flow meter provided in said liquid material supply line 33, and reference numeral 35 designating a gas line on the downstream side of the vapor controller 1 wound with a heater 36 thereoutside. Reference numeral 37 designates a controller receiving a signal from said liquid flow meter 34 to conduct a feedback control.

In a system having the above described construction, a quantity of liquid material LM flowing through the liquid material supply line 33 toward the vapor controller 1 is detected by the liquid flow meter 34 to be put in said controller 37. A set flow rate is preliminarily put in the controller 37 to compare a detected flow rate with said set flow rate. The controller 37 controls said quantity of liquid material LM introduced into the vapor controller 1 to an appointed value by controlling a voltage applied to said actuator 29 of the vapor controller 1 on the basis of this comparison. The whole liquid material LM controlled to an appointed flow rate is vaporized within the vaporizing chamber 21 and the gas G generated by this vaporization is sent to the apparatus for producing semiconductors (not shown) through a gas line 36.

Consequently, in the above described system, the gas, which has been controlled to said appointed flow rate, can be stably supplied to a use point (in this case, the apparatus for producing semiconductors) on and after the vapor controller 1. In addition, an optional flow rate of gas can be obtained by changing the set flow rate and a pressure-change in the liquid material supply line 33 can be eliminated in a short time even if it is produced.

As understood from the above description, in the vapor controller according to a first preferred embodiment of the present invention, the liquid material LM is vaporized in a remarkably short time by the pressure-drop accompanied by a flow thereof into the vaporizing chamber 21 and giving a thermal energy. Consequently, the body block 1a may be housed in a thermostatic oven or constructed so as to be heated from an outside source, for example heat by means of an infrared lamp, in place of including the heater 2 and said temperature sensor 3 in the body block 1a.

And, in the above described every case, the body block 1a may be made of heat-resisting materials, for example ceramics or heat-resisting resins such as fluororesins, other than metals.

In addition, the vaporizing chamber 21 may be formed within the body block 1a. And, in the case where the body block 1a is heated by means of the heater 2, the heater may be a plate heater and it is sufficient that in particular a vicinity of the vaporizing chamber 21 of the body block 1a can be heated. Furthermore, it is unnecessary to form the liquid material inlet passage 4 and the gas outlet passage 5 in a hook-like shape, that is they may be straight. Moreover, an electro-magnetic actuator and a thermal actuator may be used as the actuator 29.

And, the liquid material LM is not limited by those which are liquidous at normal temperature and pressure but may be those which are gaseous at normal temperature and pressure but liquidous at normal temperature by the suitable pressurization.

Besides, as shown in FIG. 5, the liquid material supply line 33 for the vapor controller 1 may be provided with a heater 38 wound therearound to preliminarily heat the liquid material LM, whereby preliminarily giving a thermal energy required for the vaporization to the liquid material LM. In case of such the construction, the vaporization within the vapor controller 1 can be more efficiently conducted and thus a larger flow rate of gas can be easily obtained.

Figure 6:
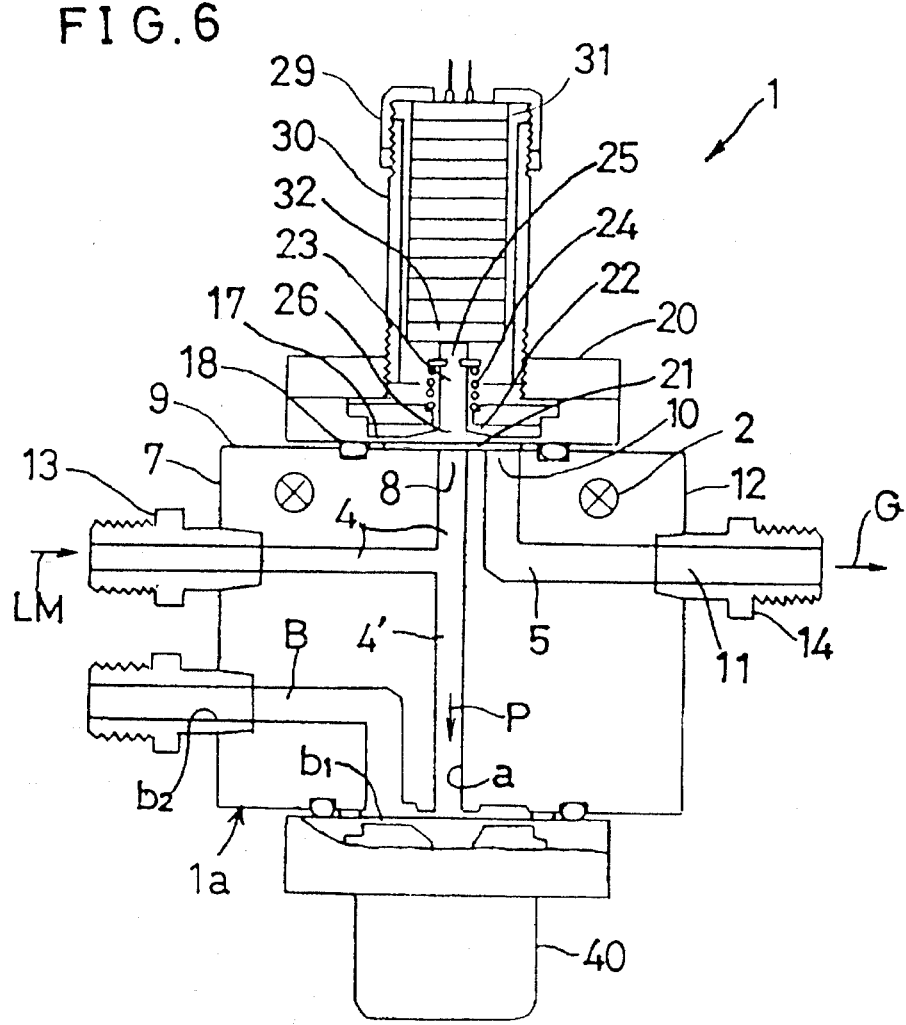
FIG. 6 is a longitudinal sectional view showing a second preferred embodiment of said vapor controller according to the present invention.
Figure 7:
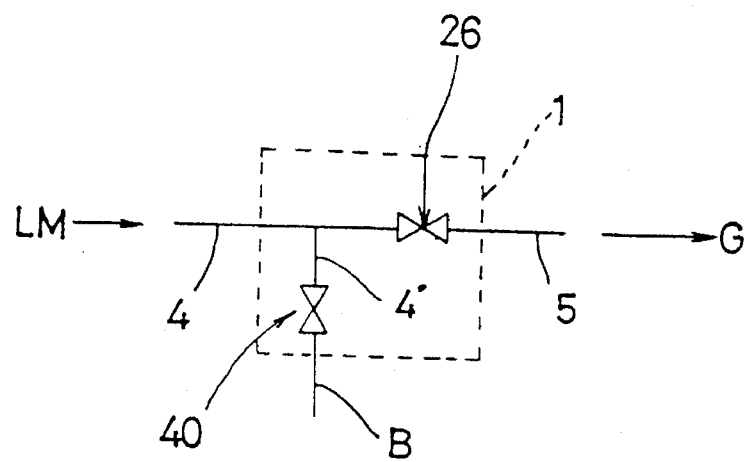
FIG. 7 is a block diagram showing a construction at the time when a liquid material as a drain is removed from an inside of a pipe of a liquid material inlet passage in said second preferred embodiment.

FIGS. 6, 7 show a second preferred embodiment of the liquid material vapor controller having the vapor controller according to the present invention. FIG. 6 is a longitudinal sectional view and FIG. 7 is a block diagram constructed when the liquid material as a drain is removed from an inside of a pipe of the liquid material inlet passage. In addition, in these drawings, members designated by the same one reference numerals as in FIGS. 1 to 5 are same one as or equivalent to those in FIGS. 1 to 5, so that their detail descriptions are omitted.

Referring to FIGS. 6, 7, the vapor controller is provided with a vapor controller 1 having a vaporizing function and a flow rate-adjusting function and vaporizing a liquid material LM supplied from a liquid material tank, a liquid material inlet passage 4 and a gas outlet passage 5 formed within a body block 1a of said vapor controller 1, a first line 4' having a communication port a communicated with an outside of said body block 1a branched from said liquid material inlet passage 2, a second line B formed so as to be communicated with said outside of the body block 1a at communication ports b1, b2 thereof for purging the liquid material inlet passage 4 and an on-off valve 40 provided on an outer periphery of the body block 1a for making a communication of said first line 4' with said second line B possible by opening and closing a seat portion (not shown) thereof.

Known valves, such as a pneumatic always closed-type valve provided with a pneumatic valve (seat portion), which is always (during an operation of the vapor controller 1) closed and changed over to an opened condition by an air pressure, a manual stop valve, of which valve (seat portion) is opened and closed by operating a handle, and the like can be used according to circumstances as said on-off valve 40 having a seat portion.

Referring to FIG. 6, the body block 1a is made of metallic materials, such as stainless steels, superior in thermal conductivity and corrosion resistance in a rectangular parallelepiped shape. This body block 1a is provided with for example a cartridge heater 2 included therein for heating the whole body block 1a.

Consequently, the vapor controller 1 according to this preferred embodiment can be always operated by merely setting said seat portion of the on-off valve 40 to a closed condition. In this case, said communication port a of the first line 4' and said communication port $b_1$ of the second line B is closed with the seat portion, respectively.

Figure 8:
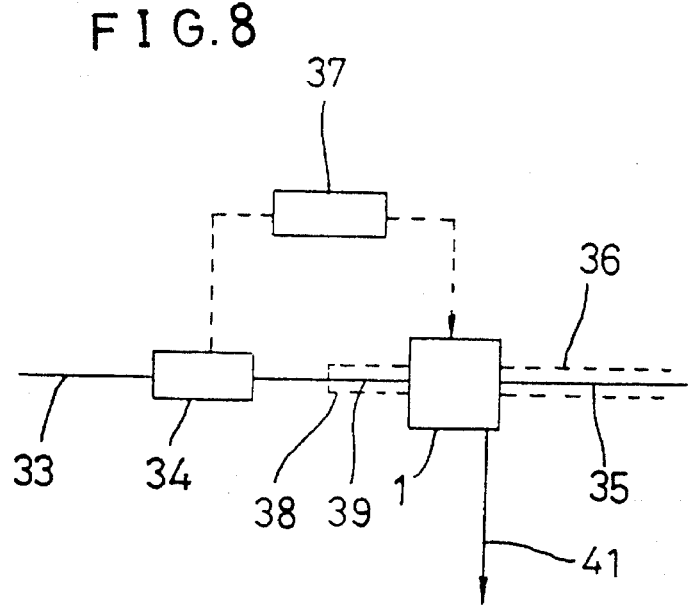
FIG. 8 is a block diagram showing a material supply line with the vapor controller incorporated therein.

FIG. 8 shows an example in which the vapor controller 1 having the above described construction is incorporated in for example a material supply line of the apparatus for producing semiconductors. Referring to FIG. 8, reference numeral 33 designates a liquid material inlet passage on the upstream side of the vapor controller 1 communicated with the liquid material inlet passage 4 shown in FIG. 6, reference numeral 34 designating a liquid flow meter provided in said liquid material inlet passage 33, and reference numeral 35 designating a gas line on the downstream side of the vapor controller 1 (corresponding to the gas outlet passage 5 in FIG. 6) wound with a heater 36 thereoutside. Reference numeral 37 designates a controller receiving a signal from said liquid flow meter 34 to conduct a feedback control. Besides, a pipe 39 between the liquid flow meter 34 and the vapor controller 1 is provided with a heater 38 wound therearound to preliminarily heat the liquid material LM, whereby preliminarily giving a thermal energy required for the vaporization to the liquid material LM. In case of such the construction, the vaporization within the vapor controller 1 can be more efficiently conducted and thus a larger flow rate of gas can be easily obtained. And, a purge line 41 branched from the liquid material inlet passage 4 is provided.

In addition, the liquid material inlet passage 4 formed in an inside of the body block 1a of the vapor controller 1 is provided with a first line 4' communicated with an outside of the body block 1a, a second line B being formed within the body block 1a so as to be communicated with said outside of the body block 1a at both end portions b1, b2 thereof, and an on-off valve 40 being provided on an outer periphery of the body block 1a for making a communication of said first line 4' with said second line B possible by opening and closing a seat portion thereof, so that a purge through the vapor controller can be avoided differently from in the conventional method when the liquid material LM is to be sufficiently removed from an inside of the pipe of the liquid material inlet passage 33. As a result, a pressure-loss due to a flow of the liquid material LM through the vapor controller 1 can be completely eliminated and thus the sufficient purging efficiency can be achieved.

Furthermore, the liquid material inlet passage 33 can be purged without sending the liquid material LM in an exhaust pump of the apparatus for producing semiconductors provided on the secondary side (downstream side) of the vapor controller 1. Moreover, the vapor controller 1 can be always operated by merely leaving the on-off valve 40 under the closed condition where the first line 4' cannot be communicated with the second line B, that is, it becomes unnecessary that said exhaust pump is expressly used to conduct the purge, and thus not only a number of parts used for the purge can be kept at a minimum but also a maintanance can be easily conducted.

The present invention is not limited by the above described preferred embodiments but various kinds of modification can be applied. That is to say, the vaporizing chamber 21 may be formed within the body block 1a. The heater 2 may be a plate heater and it is sufficient that in particular a vicinity of the vaporizing chamber 21 of the body block 1a can be heated. Furthermore, it is unnecessary to form the liquid material inlet passage 4 and the gas outlet passage 5 in a hook-like shape, that is, they may be straight. Moreover, an electro-magnetic actuator and a thermal actuator may be used as the actuator 29.

And, the liquid material LM is not limited by those which are liquidous at normal temperature and pressure but may be those which are gaseous at normal temperature and pressure but liquidous at normal temperature by the suitable pressurization.

Figure 9:
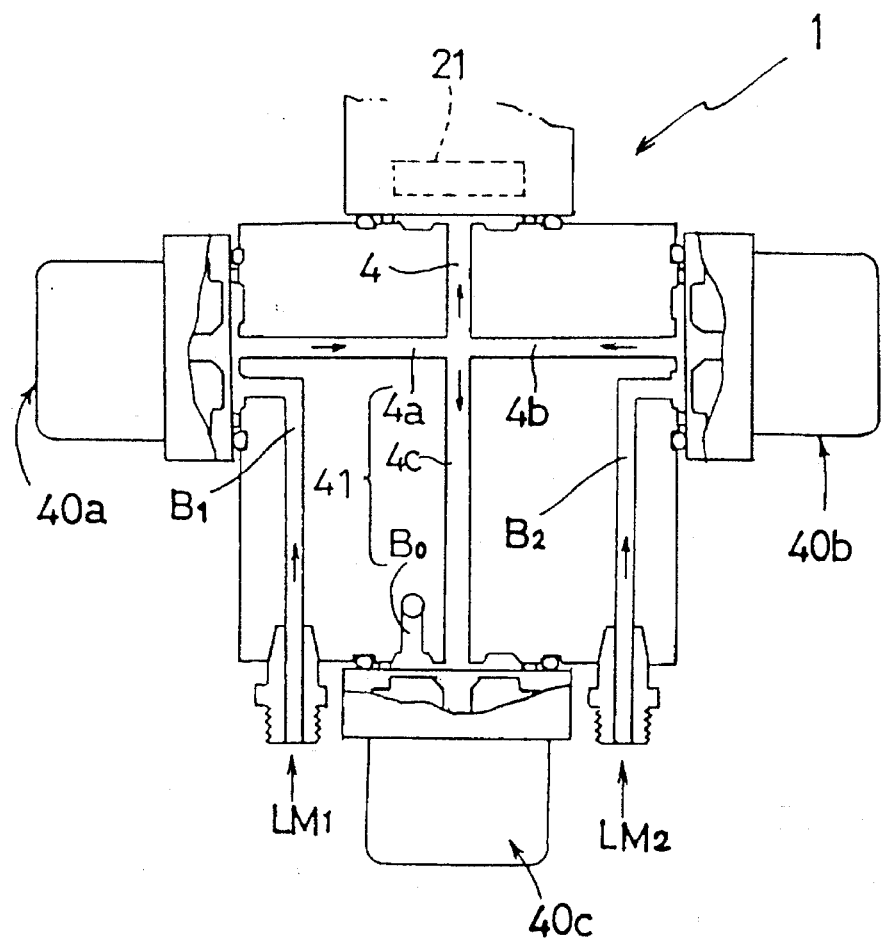
FIG. 9 is a block diagram showing principal parts in a third preferred embodiment of the present invention.

FIG. 9 shows a third preferred embodiments of the present invention in which a supply of a second liquid material LM 2 is stopped by means of an on-off valve and a first liquid material supply line 4a and a main liquid material inlet passage 4 within a vapor controller 1 are purged with a first liquid material $LM_1$ followed by supplying a vaporizing chamber 21 with said first liquid material $LM_1$.

Referring to FIG. 9, a liquid material vapor controller comprises a vapor controller 1, a liquid material inlet passage 4 communicated with a vaporizing chamber 21 formed within a body block 1a of said vapor controller 1, a plurality of liquid material supply lines 1a, 4b, 4c branched from said liquid material inlet passage 4, communication lines $B_0$, $B_1$, $B_2$ of a number corresponding to said liquid material supply lines 4a, 4b, 4c communicated with an outside of said body block 1a at both end portions thereof and provided within the body block 1a, a plurality of on-off valves 40a, 40b, 40c connecting said communication line $B_0$, $B_1$, $B_2$ with the liquid material supply line 4c, 4a, 4b corresponding to the communication line $B_0$, $B_1$, $B_2$, respectively, and seat portions (not shown) provided in the respective on-off valves 40a, 40b, 40c for making a communication of the respective communication lines $B_0$, $B_1$, $B_2$ with the liquid material supply lines 4a, 4b, 4c corresponding to the respective communication lines $B_0$, $B_1$, $B_2$ possible. In this preferred embodiment, one on-off valve 40c selected from a plurality of on-off valves 40a 40b, 40c is used for purging the first liquid material supply line 4a and the liquid material inlet passage In addition, a purge line 41 comprises the first liquid material supply lines 4a, 4c and the communication line $B_0$.

On the contrary, in the case where said second liquid material $LM_2$ is supplied, it is sufficient that a supply of the first liquid material $LM_1$ is stopped by means of the on-off valve 40a and the second liquid material supply line 4b and the liquid material inlet passage 4 within the vapor controller 1 are purged with the second liquid material $LM_2$ followed by supplying the vaporizing chamber 21 with the second liquid material $LM_2$.

In addition, in the above described third preferred embodiment, also a gas purge can be used for the purge of the respective liquid material supply lines 4a, 4b and the liquid material inlet passage 4 in the same manner as in the above described first preferred embodiment.

Furthermore, in the third preferred embodiment, the following construction may be adopted. That is to say, a liquid flow meter detecting a flow rate of the liquid material $LM_1$, $LM_2$ flowing toward the vapor controller 1 from the liquid material inlet passage 4 through the liquid material supply line 4a, 4b, respectively, is provided, a controller in which a set flow rate has been preliminarily put being provided, a detected flow rate being compared with said set flow rate in said controller, and the controller controlling a voltage applied to the actuator 29 of the vapor controller 1 on the basis of the above described comparison to control said flow rate of the liquid material $LM_1$, $LM_2$, introduced into the vapor controller 1, respectively, to an appointed value.

Moreover, a third liquid material $LM_3$ can be supplied to the liquid material supply line 4c through the on-off valve 40c from the communication line $B_0$ connected with said liquid material tank. In this case, the purge with said third liquid material $LM_3$ can be conducted by using either of the on-off valves 40a, 40b to form said purge line 41. In addition, the purge can be conducted also by said gas purge.

Figure 10:
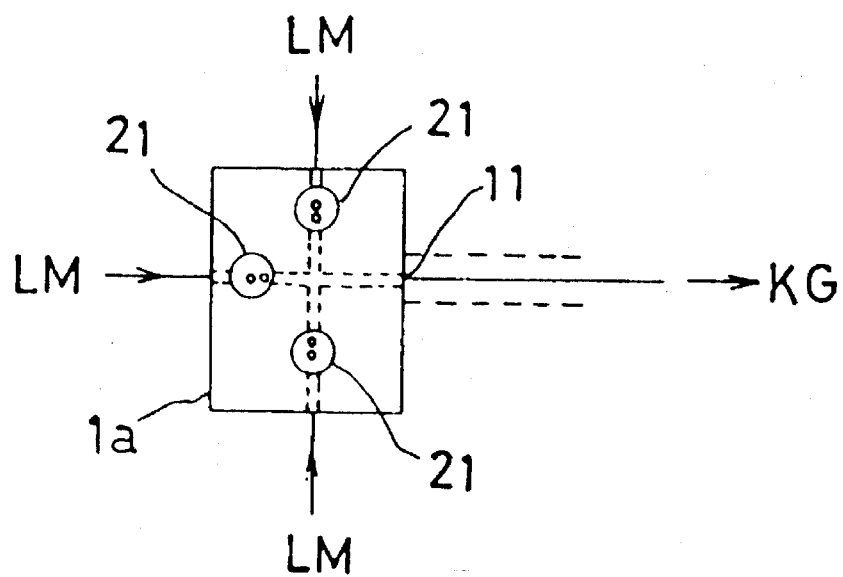
FIG. 10 is a drawing roughly showing a plane construction of a body block according to another preferred embodiment of the present invention.

Furthermore, as shown in FIG. 10, one body block 1a may be provided with a plurality of (three in an example shown) vaporizing chambers 21 and liquid material LM inlet passages different from each other may be provided for the respective vaporizing chambers 21 to be joined on the upstream side of the gas outlet port 11, whereby taking out a mixture gas KG.

Figure 11:
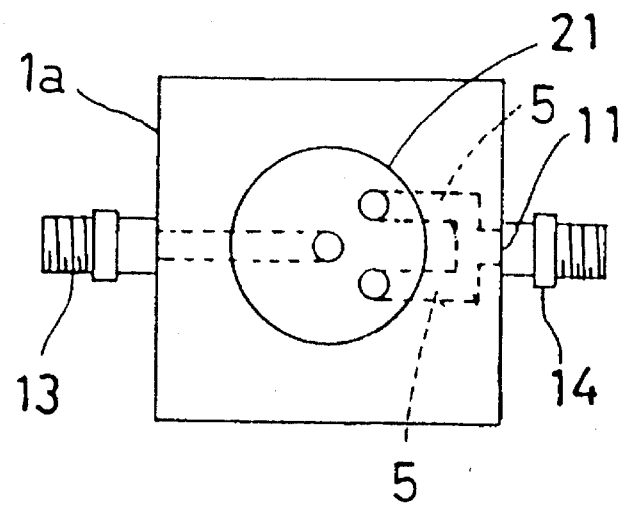
FIG. 11 is a drawing roughly showing a plane construction of a body block according to still another preferred embodiment of the present invention.
Figure 12:
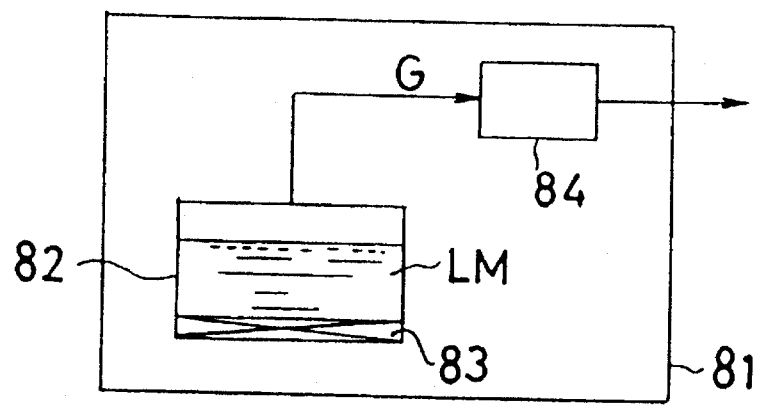
FIG. 12 is a drawing showing the conventional vapor controller.
Figure 13:
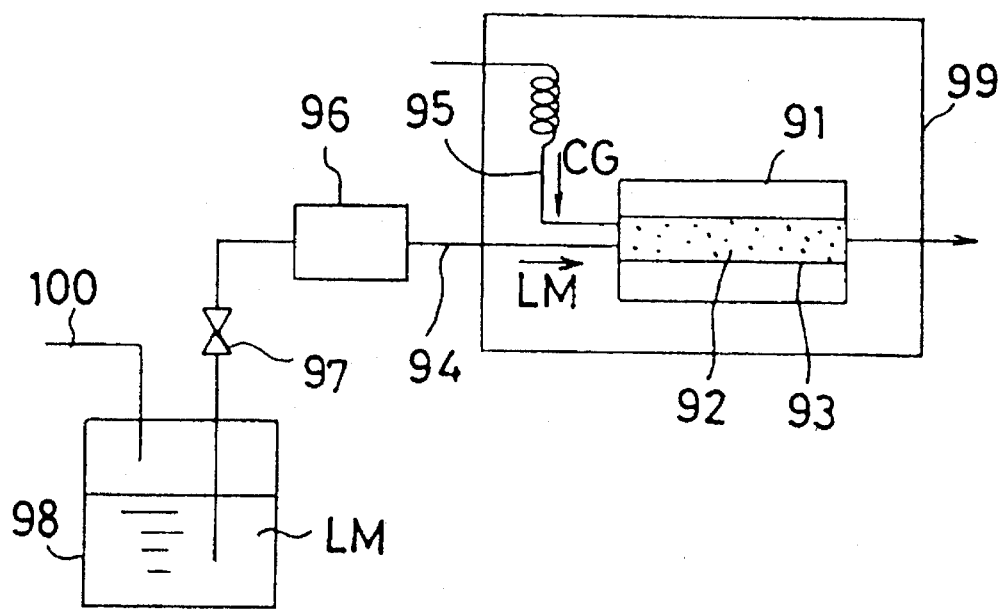
FIG. 13 is a drawing showing another conventional vapor controller.

Besides, as shown in FIG. 11, a plurality of (two in an example shown) gas outlet passages 5 may be provided between the vaporizing chamber 21 and the gas outlet port 11. In this case, a pressure-loss of the gas outlet passage 5 is reduced and a pressure within the vaporizing chamber 21 is lowered, so that a vaporizing efficiency can be improved and thus a quantity of the liquid material LM introduced into the vaporizing chamber 21 can be increased so much as that.

As above described, according to the vapor controller of the present invention, the liquid material is under the liquidous and room-temperature condition until it is introduced into the vaporizing chamber, so that the decomposition and change in composition of the liquid material due to the thermal influence does not come into question differently from the conventional vapor controllers. And, in this vapor controller, the internal volume of the vaporizing chamber is remarkably small, so that the response time from the start of the vaporization of the liquid material to the stabilization of gas flow rate can be shortened as far as possible and thus the short-time generations of gas can be repeated. In addition, in this vapor controller, the vaporizing chamber has the vaporizing function and the flow rate-adjusting function, so that the apparatus can be small-sized and reduced in cost.

In addition, the respective communication lines communicated with the outside of the body block at both end portions thereof can be connected with the liquid material supply lines corresponding thereto through a plurality of on-off valves and the communication line can be communicated with the liquid material supply line corresponding thereto by means of the seat portion provided in one on-off valve selected from the on-off valves to purge the liquid material supply line. That is to say, one of characteristics of the present invention consists in that the liquid material supply line can be purged by merely using the communication line and the liquid material supply line corresponding to the communication line preliminarily formed in the body block, so that a purging course of the liquid material supply lines can be optionally selected. The selection of purge has, so to speak, a degree of freedom.

What is claimed is:

1. A vapor controller apparatus for controlling the rate of vaporization of a liquid, comprising:

a housing body having a first surface, an inlet port for providing an introduction of a liquid, and an exit port for exhausting gas formed from the vaporized liquid;

a movable diaphragm assembly having a second surface extending across the first surface and sealed to the first surface at a periphery, a space between the first and second surfaces forming a vaporizing chamber, a portion of the second surface forming a valve body for contacting the inlet port; and means for moving the diaphragm assembly to control the opening and closing of the inlet port whereby the rate of vaporization is controlled within the vaporizing chamber and the gas formed from the vaporized liquid is exhausted from the vaporizing chamber.

2. The vapor controller of claim 1 further including a source of heat connected to the housing body for providing heat to the vaporizing chamber.

3. The vapor controller of claim 1 wherein the inlet port is positioned concentrically with the diaphragm second surface and the exit port is radially offset.

4. The vapor controller of claim 3 further including a concentric groove in the first surface surrounding the inlet port, the exit port being in fluid communication with the concentric groove.

5. The vapor controller of claim 3 wherein the first surface has a raised central portion surrounding the inlet port for contacting the valve body of the diaphragm assembly.

6. The vapor controller of claim 1 wherein the housing body further includes a bypass system connected to the inlet port.

7. The vapor controller of claim 1 wherein the means for moving the diaphragm assembly includes a piezoactuator member.

8. The vapor controller of claim 7 wherein the movable diaphragm assembly includes a shaft portion connected to the piezoactuator member.

9. The vapor controller of claim 1 wherein the second surface is coated with a fluororesin material.

10. A vapor controller apparatus for controlling the rate of vaporization of a liquid, comprising:

a housing body having a first surface, an inlet port for providing an introduction of a liquid, and an exit port for exhausting gas formed from the vaporized liquid;

a movable diaphragm assembly including a unitary diaphragm having a second surface extending across the first surface and sealed to the first surface at a periphery, a space between the first and second surfaces forming a vaporizing chamber, a portion of the second surface forming a valve body for contacting the inlet port; and means for moving the diaphragm assembly to control the opening and closing of the inlet port whereby the rate of vaporization is controlled within the vaporizing chamber and the gas formed from the vaporized liquid is exhausted from the vaporizing chamber including a controller for determining the amount of movement of the diaphragm assembly to control the flow rate of the liquid.

11. The vapor controller of claim 10 further including an inlet line for supplying liquid to the inlet port and a heater connected to the inlet line for preliminarily applying thermal energy to the liquid.

12. The vapor controller of claim 10 further including a source of heat connected to the housing body for providing heat to the vaporizing chamber.

13. The vapor controller of claim 10 wherein the inlet port is positioned concentrically with the diaphragm second surface and the exit port is radially offset.

14. The vapor controller of claim 13 further including a concentric groove in the first surface surrounding the inlet port, the exit port being in fluid communication with the concentric groove.

15. The vapor controller of claim 13 wherein the first surface has a raised central portion surrounding the inlet port for contacting the valve body of the diaphragm assembly.

16. The vapor controller of claim 10 wherein the housing body further includes a bypass system connected to the inlet port.

17. A vapor controller apparatus for controlling the rate of vaporization of a liquid, comprising:

a housing body having an upper first surface with an inlet port for providing an introduction of a liquid, a groove extending around the inlet port and extending into the first surface, and an exit port connected to the groove for exhausting gas formed from the vaporized liquid;

means in the housing body for heating the groove of the first surface;

a movable diaphragm assembly including a diaphragm member having a second surface extending across the first surface and sealed to the first surface at a periphery, a space between the first and second surfaces forming a vaporizing chamber, a portion of the second surface forming a valve body for contacting the inlet port; and means for moving the diaphragm assembly to control the opening and closing of the inlet port whereby the rate of vaporization is controlled within the vaporizing chamber and the gas formed from the vaporized liquid is exhausted from the vaporizing chamber.

18. The vapor controller of claim 17 wherein the first surface has a raised central portion surrounding the inlet port for contacting the valve body of the diaphragm assembly.

19. The vapor controller of claim 17 wherein the housing body further includes a bypass system connected to the inlet port.

\* \* \* \* \*